United States Patent [19]

Bonney

[11] 4,124,038
[45] Nov. 7, 1978

[54] MULTIWAY HYDRAULIC VALVE

[76] Inventor: Roland W. Bonney, Box 65, R.F.D. 1, Kennebunkport, Me. 04046

[21] Appl. No.: 901,427

[22] Filed: May 1, 1978

[51] Int. Cl.² .................................... F15B 13/06
[52] U.S. Cl. .................................. 137/596.2; 91/508
[58] Field of Search ............... 137/596.2, 635, 864; 91/413

[56] References Cited

U.S. PATENT DOCUMENTS

| 3,171,437 | 3/1965 | Suechting | 137/596.2 |
| 3,602,243 | 8/1971 | Holt et al. | 91/413 X |

Primary Examiner—Martin P. Schwadron
Assistant Examiner—Gerald A. Michalsky
Attorney, Agent, or Firm—William Nitkin

[57] ABSTRACT

A multiway hydraulic valve comprising a valve housing having a cylindrical bore, a first and second inlet, an outlet, a first series and second series of operation ports all defined in the valve housing. Check means are associated with the first and second inlets and with each operation port of said first and second series of operation ports. A spool member is positioned axially slideable and rotatable within the cylindrical bore having operation means associated therewith adapted to open a selected operation port of one of said series of operation ports allowing it to vent through said outlet while at the same time pressurizing only the operation ports of the other series of operation ports. Sealing means to seal the spool member within the cylindrical bore in a fluid-tight relation and stop means to limit the axial movement of the spool member are also provided.

8 Claims, 5 Drawing Figures

MULTIWAY HYDRAULIC VALVE

BACKGROUND OF THE INVENTION

1. Field of the Invention

This invention relates to valves, and more particularly to multiway spool valves utilized in hydraulic control systems.

2. Description of the Prior Art

Spool valves for utilization with hydraulic control system including the use of multiway valves such as four-way valves are well-known in the prior art. The inventor of the present invention has received two prior United States patents in this area, namely U.S. Pat. Nos. 3,774,504 for a Sliding Spool Valve and 4,027,697 for a Rotary Valve. These patents and the references cited therein are related to the field in which the present invention resides.

SUMMARY

The present invention is a multiway valve that utilizes only one valve housing with only one main cylindrical bore therein and a spool being either of a closed-center or tandem-center design for use in an hydraulic system such as one in which a pair of hydraulic lines communication with an hydraulic cylinder on opposite sides of the piston mounted therein.

It is the object of the present invention to replace multiples of single valves or of four-way control valves.

It is a further object of the present invention to eliminate the need for, and use of, load-holding or cylinder-locking valves.

The basic principle for operation of the device of this invention is to pressurize the line to one side of all the cylinders, motors, or other items to which the hydraulic lines run and, at the same time to vent the cylinder's other line or the other line of the item desired to be operated either to exhaust or to the fluid tank.

It is an additional object of the present invention to maintain a constant flow rate of the fluid medium regardless of the number of operation ports utilized in the construction of the valve.

It is yet another object of the present invention to have valves of multiple-port design which can be efficiently and easily operated by manipulating a single control.

The present invention is comprised of a valve housing having a cylindrical bore, a first and second inlet means, and an outlet means, all communicating into the cylindrical bore. A first series of operation ports are defined in the valve housing disposed radially in a plane transverse to the axis of, and communicating into, the cylindrical bore, the first series of operation ports being further positioned axially along the cylindrical bore to one side of the first and second inlet means and outlet means and a second series of operation ports are defined in the valve housing disposed radially in a plane transverse to the axis of, and communicating into, the cylindrical bore, the second series positioned axially along the cylindrical bore to the other side of the first and second inlet means and outlet means as the first series of operation ports. Check means are associated with each of the first and second inlet means and with each operation port of the first and second series of operation ports which are normally biased closed but adapted to be opened. Such check means include a portion thereof adapted to protrude when normally biased closed into the cylindrical bore through the first and second inlet ports and the first and second series of operation ports, with the check means being openable upon outward movement of each protruding portion of the check means from the cylindrical bore. A spool member is positioned axially slideable and rotatable within the cylindrical bore having operation means associated therewith adapted to open a selected operation port of one of the series of operation ports allowing it to vent through the outlet means while at the same time pressurizing only the operation ports of the other series of operation ports. Such operation means can include a central spool projection extending circumferentially around the spool member, the central portion of which projection makes contact with the cylindrical bore thereby defining a first chamber on one side and a second chamber on the other side thereof. The sides of the spool projection form first and second spool projection shoulders which slope downward toward the spool member. Toward each end of the spool member projecting radially therefrom and sloping inwardly are first and second spool projection shoulders adapted to depress either the first or second inlet means' check means when the spool member is axially moved, while at the same time one of the first and second shoulder members is adapted to depress one of the check means in either the first or second series of operation ports depending on the rotated position of the spool member and the direction of the spool member's axial movement.

A second embodiment of the device of this invention utilizes a tandem-designed central spool projection extending circumferentially around the spool member, the central portion of which makes contact with the cylindrical bore defining a first chamber on one side and a second chamber on the other side thereof, the sides of which tandem projection form first and second tandem shoulders which slope downward toward the spool member and which central spool projection, while the spool member is centrally positioned in the cylindrical bore under the inlet ports, opens the first and second inlet ports. The spool member in this embodiment further includes first and second shoulder members positioned toward each end thereof projecting radially outward therefrom and can slope inwardly toward the spool member. These first and second tandem shoulders are adapted to depress further one of the check means of the first or second inlet means when the spool member is axially moved, while at the same time designed to allow the other inlet means to close; and at the same time the first and second shoulder members are adapted to depress at least one of the check means of the first or second series of operation ports depending on the rotated position of the spool member and the direction of the spool member's axial movement.

In each embodiment sealing means can be positioned toward each end of the spool member to seal the spool member within the cylindrical bore in a fluid-tight relation, and stop means can be provided to limit the axial movement of the spool member.

The objects and design of the instant invention will become clearer and reference to the following drawings and Description of the Preferred Embodiment below.

DESCRIPTION OF THE PREFERRED EMBODIMENT

Figure 1:
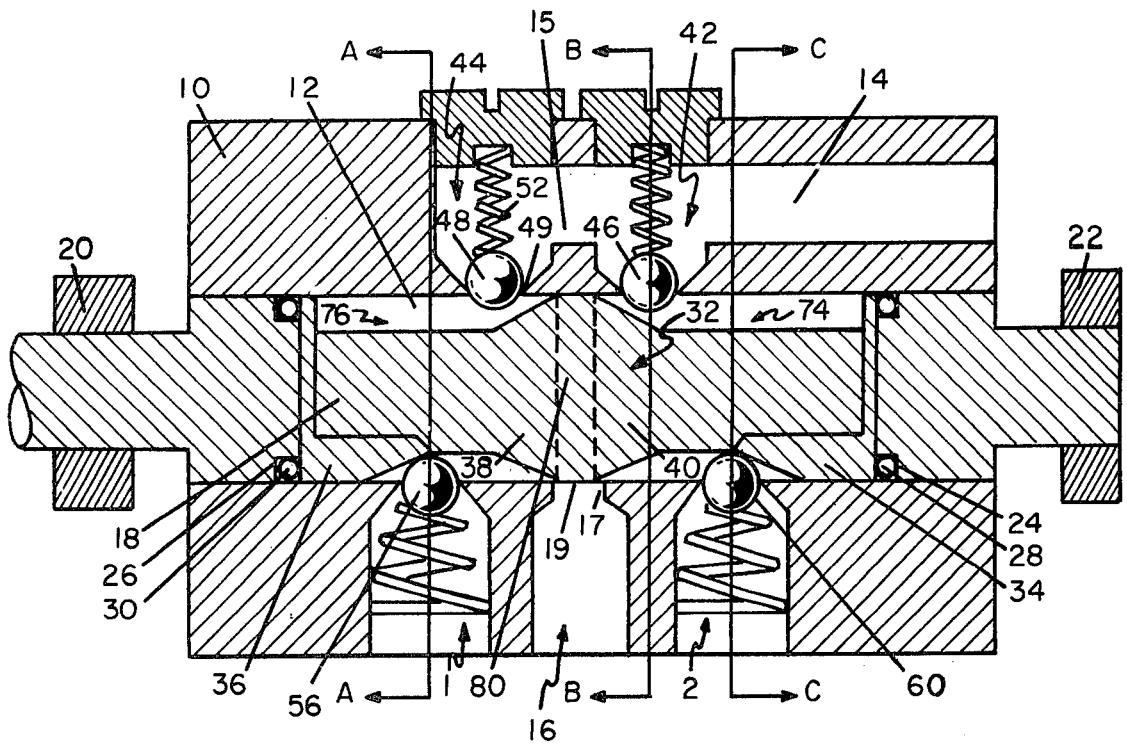
FIG. 1 is a cross-sectional view through the device of this invention utilizing a closed-center spool.

FIG. 1 illustrates the device of this invention having a valve housing 10 with a cylindrical bore 12 defined therein. Valve housing 10 further contains inlet 14 which communicates through inlet bore 15 to first inlet port 42 and second inlet port 44 which in turn communicate with the cylindrical bore 12. Also contained within valve housing 10 is outlet 16 which also communicates through outlet bore 17 and outlet port 19 with cylindrical bore 12. A first series of operation ports are defined in valve housing 10, one of which is seen in FIG. 1, extending radially in a transverse plane around cylindrical bore 12, each of the first series of operation ports communicating into the cylindrical bore. A second series of operation ports, one of which is seen in FIG. 1, also extend radially in a transverse plane around cylindrical bore 12, each of the second series of operation ports communicating into cylindrical bore 12.

Figure 2:
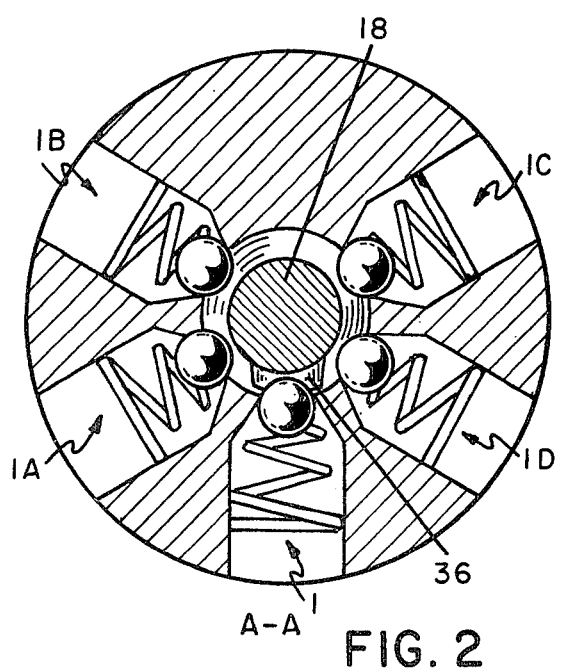
FIG. 2 is a cross-sectional view through A—A of FIG. 1.
Figure 3:
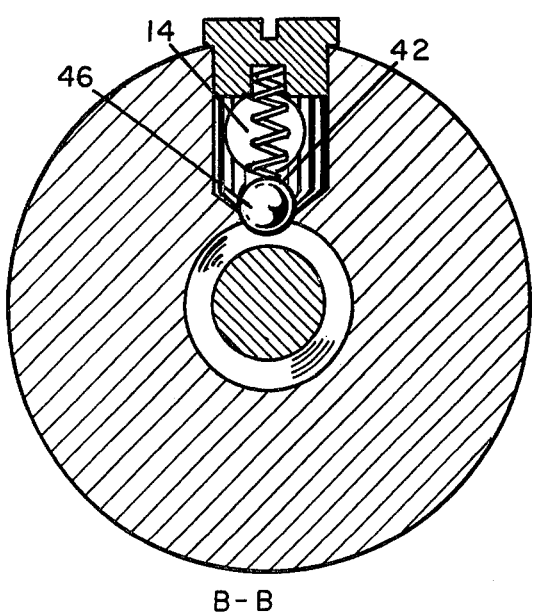
FIG. 3 is a cross-sectional view through B—B of FIG. 1.
Figure 4:
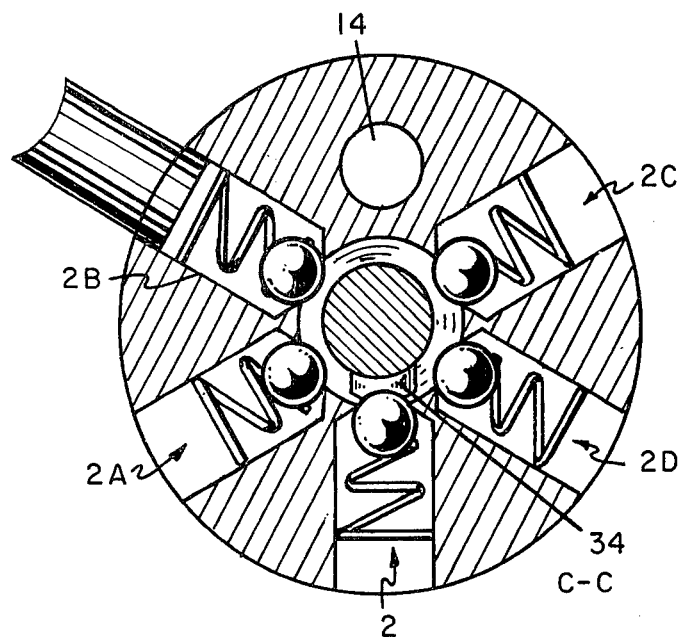
FIG. 4 is a cross-sectional view through C—C of FIG. 1.

FIG. 2 shows a cross-sectional view through A—A of FIG. 1 illustrating more clearly the radial plane of operation ports which extend around the circumference of, and communicate with, cylindrical bore 12. Within each of the inlet ports and operation ports is a ball-check member illustrated as a sphere such as ball check member 48 in FIG. 1. Each port constricts at its end facing cylindrical bore 12 forming a seat such as 49 in FIG. 1 in which the ball-check can fit in a fluid-tight relation. A ball-check spring member such as 52 in FIG. 1 is adapted within each port to urge against the ball-check member thereby forcing it against the seat and closing the port into cylindrical bore 12. Each port and its seat are adapted so that each of the ball-check members when seated has a face extending into cylindrical bore 12. It should be noted that hydraulic lines a portion of one being illustrated in FIG. 4 run to the inlet, outlet, first series of operation ports, and second series of operation ports, all of which have means of attachment to be interconnected with all of the above openings, such means of attachment, for example screw threading, etc., being well-known in the art.

Within cylindrical bore 12 is substantially cylindrical spool 18 which is adapted to slide axially and rotate therein. Spool 18 is provided with sealing means at each end so that the interior portion of the spool is in a fluid-tight relation with valve housing 10. The sealing means can be of several embodiments, and for example can be comprised of first seal ring groove 24 and second seal ring groove 26 defined near the ends of spool 18 having a first seal ring 28 and second seal ring 30 contained respectively therein which make contact with cylindrical bore 12 in fluid-tight relation or any equivalent sealing means. The diameter of spool 18 between the sealing means is generally narrower than the diameter of cylindrical bore 12 except for a central spool projection 32 which projects circumferentially and extends generally closer to the walls of the cylindrical bore and at a central portion 80 of the central spool projection makes contact with cylindrical bore 12. The point of contact of the central portion 80 of the central spool projection defines on either side thereof between it and each of the sealing means a first chamber 74 and a second chamber 76 being the spaces between the narrower portion of spool 18 and cylindrical bore 12. A first spool projection shoulder 40 and a second spool projection shoulder 38 extend from either side of central portion 80 and slope back toward the narrower portion of spool 18. Stopping means are provided to allow only limited axial movement of spool 18 within cylindrical bore 12. Such stopping means can be provided, for example, by stop rings such as first stop ring 20 and second stop ring 22 which are affixed to portions of spool 18 and which alternately strike valve housing 10 when spool 18 is in its most advanced position in either direction. Also projecting radially out of spool 18 are first shoulder member 34 located in a position near the first seal ring 28 and second shoulder member 36 located near the second seal ring 30. First shoulder member 34 and second shoulder member 36 slope inwardly toward the narrower portion of spool 18 but must be at least wide enough and, at their highest point, high enough so that they can, if moved by an operation port, make contact with and force a ball-check member out of its closed position in order to allow fluid to pass by. In one embodiment the spool's first and second shoulder members can be of sufficient width so that they could make contact with the two ball-check members if the spool were rotated to an intermediate position between two adjacent operation ports.

In operation, the device as illustrated in FIG. 1 is in a passive position with the central portion 80 of the central spool projection centrally located above outlet 16 and the first and second shoulder members 34 and 36 positioned so that none of the ball-checks in either the inlet or operation ports are open thereby keeping all of the fluid static within the hydraulic system. Spool 18 can be manipulated within valve housing 10 by pushing or pulling it as far as it will travel toward either end into an active position. Spool 18 at the same time can be rotated if desired so that its first or second shoulder member can open a selected one of the operation port ball-checks. As mentioned above, a plurality of ports are arranged radially and axially in a perpendicular plane around cylindrical bore 12. Any number of operation ports can be placed around the cylindrical bore. Illustrated, as an example, is an embodiment having five operation ports in each plane. If, for example, the spool illustrated in FIG. 1 is pulled to the right active position, ball-check 46 from first inlet port 42 would be lifted by first spool projection shoulder 40 and would allow pressure to enter into first chamber 74 which is sealed off from the rest of the unit by the central portion 80 of the central spool projection thereby allowing pressure to enter from inlet 14 through open first inlet port 42 which pressurizes first chamber 74 and all of the operation ports 2, 2a, 2b, 2c, and 2d entering into first chamber 74. At the same time second shoulder member 36 would would depress first operation port ball-check 56 thereby opening first operation port 1 allowing the pressure therein to vent into second chamber 76 and escape through outlet 16. Thus only the cylinder, motor, or other item associated with first operation port 1 will operate. Alternately, if the spool is pushed into its left active position, it will depress second operation port ball-check 60 and open second operation port 2 allowing it to release fluid into outlet 16 through first chamber 74 and alternately, second spool projection shoulder 38 will raise second inlet port ball-check 48 in second inlet port 44 to pressurize the first group of operation ports 1, 1a, 1b, 1c, and 1d. As can be seen, there are many alternative positions of spool 18 as one rotates it in one active position to hit any selected operation port ball-check in the first plane or in the other active position in the second plane of operation ports. As mentioned above, first shoulder 34 and/or second shoulder 36 can be designed to be of a width such that when rotated to an intermediate position between two operation ports, one shoulder can strike two ball-checks at the same time thereby activating two cylinders, motors, or other items for their simultaneous operation. It should be noted that although spherical ball-checks have been illustrated, other than spherical ball-checks can be utilized as long as the checking means can be sealed against the seat of the port and can be depressed therefrom by a shoulder pushing against them to allow fluid to gain entry into the first or second chambers. Further spool 18 can be detented both axially and radially or spring-centered axially and detented radially so that the passive neutral position and the position of the operation ports will be easier to locate by the user. Also remote radial selection of operation positions could be achieved by a rotor motor rotating the spool to a position aligning a shoulder with a selected port's ball-check, and an electromagnetic solenoid can push or pull the spool axially to activate the selected port of the selected series of ports although such remote electric operation is optional and not necessary to the operation of the multiway valve disclosed herein.

Figure 5:
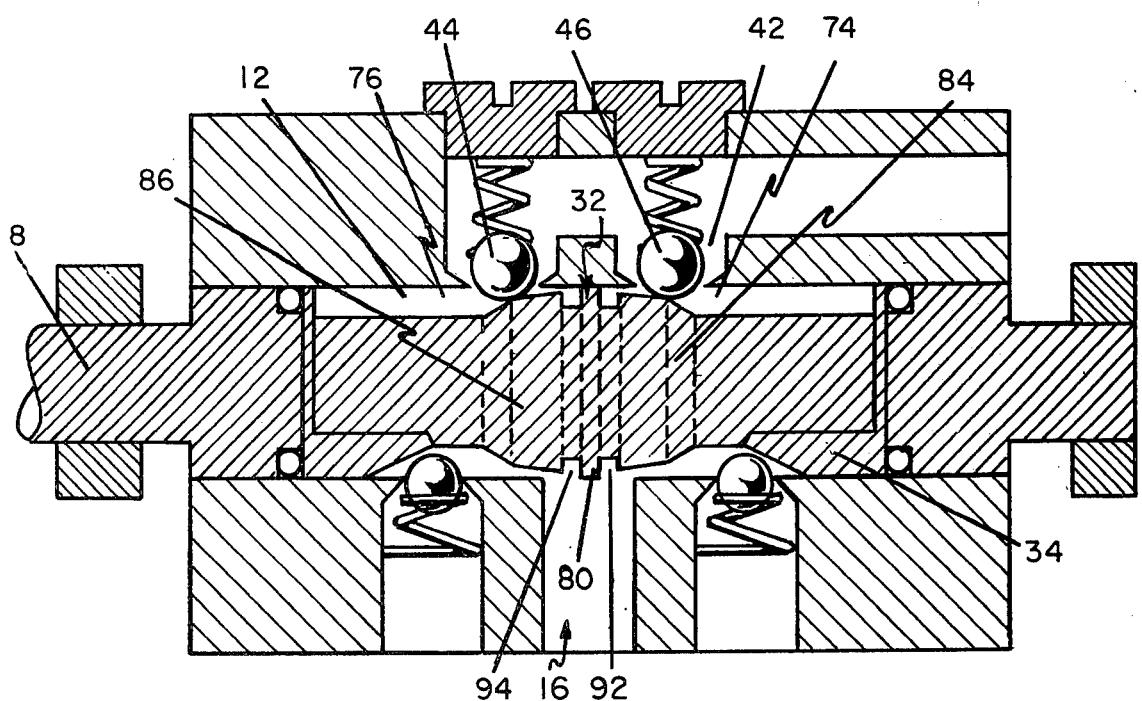
FIG. 5 is a cross-sectional view through the device of this invention utilizing a tandem-center spool.

A second embodiment of the device of this invention utilizes a tandem-center central spool projection as seen in FIG. 5. The tandem-center spool is useful in hydraulic systems that have a continuous flow of hydraulic fluid therein. In the tandem-center spool the central portion 80 of the central spool projection 32 makes contact with cylindrical bore 12 but on either side thereof are first and second tandem shoulder 84 and 86 respectively. In the embodiment illustrated in FIG. 5 the first and second tandem shoulders are separated from the central portion 80 of the central spool projection by a first and second tandem spool grooves, 92 and 94, respectively. First and second tandem shoulders 84 and 86 extend slightly sloping toward each end of spool 18 a longitudinal distance sufficient and at a height sufficient such that when the spool is in the central passive position, they meet and slightly lift the ball-checks of the first and second inlet ports. This action causes the fluid to enter these ports, pass through the first and second chambers 74 and 76 and leave through outlet 16. Due to the presence of outlet 16 insufficient pressure builds up to pressurize any of the operation ports. When the spool is axially slid to an active position, as for example to the left, the second tandem shoulder 86 raises the ball-check in the second inlet port 44 allowing more fluid to enter the second chamber 76 which is now sealed off by the central portion 80 of the central spool projection from the first chamber 74 and pressurize the first series of operation ports. At the same time the first tandem shoulder 84 moves to the left and of first inlet port 42 allowing its ball-check 46 to close, and first shoulder member 34 depresses the ball-check in the second operation port allowing it to vent to outlet 16 thereby operating the device connected to second operation port 2. The tandem-center spool embodiment operates similarly as the closed-center embodiment discussed above as far as selecting which of the operation ports, be it in the first or second series, is to be activated.

Although the present invention has been described with reference to particular embodiments, it will be apparent to those skilled in the art that variations and modifications can be substituted therefor without departing from the principles and spirit of the invention.

I claim:

1. A multiway hydraulic valve comprising:
   a valve housing;
   a cylindrical bore defined in said valve housing;
   a first and second inlet means defined in said valve housing communicating into said cylindrical bore;
   outlet means defined in said valve housing communicating into said cylindrical bore;
   a first series of operation ports defined in said valve housing disposed radially in a plane transverse to the axis of and communicating into said cylindrical bore, said first series of operation ports being further positioned axially along said cylindrical bore to one side of said first and second inlet means and outlet means;
   a second series of operation ports defined in said valve housing disposed radially in a plane transverse to the axis of and communicating into said cylindrical bore, said second series positioned axially along said cylindrical bore to the other side of said first and second inlet means and outlet means as said first series of operation ports;
   check means associated with each of said first and second inlet means and with each operation port of said first and second series of operation ports, said check means being normally biased closed but adapted to be opened;
   a spool member axially slideable and rotatable within said cylindrical bore;
   operation means associated with said spool member adapted to open a selected operation port of one of said series of operation ports allowing it to vent through said outlet means while at the same time pressurizing only the operation ports of the other of said series of operation ports.

2. The device of claim 1 further including sealing means positioned toward each end of said spool member adapted to seal said spool within said cylindrical bore in a fluid-tight relation.

3. The device of claim 1 further including stop means adapted to limit the axial movement of said spool member.

4. The device of claim 2 further including stop means adapted to limit the axial movement of said spool member.

5. The device of claim 1, 2, 3, or 4 wherein said check means when normally biased closed further include a portion thereof adapted to protrude into said cylindrical bore through said first and second inlet ports and said first and second series of operation ports, said check means being openable upon outward movement of each of said protruding portions of said check means from said cylindrical bore.

6. The device of claim 5 wherein said operation means further include a central spool projection extending circumferentially around said spool member, the central portion of which being adapted to make contact with said cylindrical bore, said central portion defining a first chamber on one side thereof and a second chamber on the other side thereof within said cylindrical bore, the sides of said central spool projection being adapted to form a first and a second spool projection shoulder, said spool member further including first and second shoulder members positioned toward each end thereof projecting radially outward therefrom, said first and second spool projection shoulders adapted to depress either said first or second inlet means' check means when said spool is axially moved, and at the same time said first and second shoulder members adapted to depress at least one of said check means of said first or second series of operation ports depending on the rotated position of said spool member and the direction of the spool member's axial movement.

7. The device of claim 5 wherein said operation means further include a central spool projection extending circumferentially around said spool member, the central portion of which is adapted to make contact with said cylindrical bore, said central portion defining a first chamber on one side thereof and a second chamber on the other side thereof, the sides of said central spool projection being adapted to form a first and a second tandem shoulder which first and second tandem shoulders, when said spool member is centrally positioned, are adapted to open said first and second inlet ports, and said operation means further including first and second shoulder members positioned toward each end of said spool member projecting radially out therefrom, said first and second tandem shoulders adapted to depress further one of the check means of said first or second inlet means when said spool member is axially moved, and at the same time adapted to allow the other inlet means' check means to close while at the same time said first and second shoulder members are adapted to depress at least one of said check means of said first or second series of operation ports depending on the rotated position of said spool member and the direction of the spool member's axial movement.

8. The device of claim 7 wherein said first and second tandem shoulders slope toward said spool member such that when said spool member is in a central position, the first and second inlet means' check means are biased open; and when said spool is moved to an active position, one of said inlet means' check means is opened further while the other inlet means check means' protruding portion is no longer depressed by the tandem shoulers and closes.

* * * * *